(12) United States Patent
Whalen et al.

(10) Patent No.: US 10,564,173 B2
(45) Date of Patent: Feb. 18, 2020

(54) PITOT-STATIC PROBE WITH PNEUMATIC ANGLE-OF-ATTACK SENSOR

(71) Applicant: Rosemount Aerospace Inc., Burnsville, MN (US)

(72) Inventors: Mackenzie Whalen, New Prague, MN (US); James Barron Egberg, St. Paul, MN (US); Paul Robert Johnson, Prior Lake, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 148 days.

(21) Appl. No.: 15/974,975

(22) Filed: May 9, 2018

(65) Prior Publication Data

US 2019/0346476 A1 Nov. 14, 2019

(51) Int. Cl.
| | |
|---|---|
| *G01P 5/165* | (2006.01) |
| *B64D 43/02* | (2006.01) |
| *G01F 1/46* | (2006.01) |
| *G01P 1/02* | (2006.01) |
| *G01P 13/02* | (2006.01) |

(52) U.S. Cl.
CPC ............ *G01P 5/165* (2013.01); *B64D 43/02* (2013.01); *G01F 1/46* (2013.01); *G01P 1/026* (2013.01); *G01P 13/025* (2013.01)

(58) Field of Classification Search
None
See application file for complete search history.

(56) References Cited

U.S. PATENT DOCUMENTS

| | | | |
|---|---|---|---|
| 2,204,367 A | 6/1940 | Kollsman | |
| 5,544,526 A | 8/1996 | Baltins et al. | |
| 6,892,584 B2 * | 5/2005 | Gilkison | G01P 5/165 |
| | | | 73/1.29 |
| 8,100,022 B2 * | 1/2012 | Choisnet | G01P 5/165 |
| | | | 73/861.65 |

(Continued)

FOREIGN PATENT DOCUMENTS

| | | |
|---|---|---|
| EP | 2787353 A1 | 10/2014 |
| EP | 3076185 A1 | 10/2016 |
| WO | WO91/09274 A1 | 6/1991 |

OTHER PUBLICATIONS

Extended European Search Report for EP Application No. 19173597.6, dated Sep. 23, 2019, 9 pages.

*Primary Examiner* — Natalie Huls
*Assistant Examiner* — Jermaine L Jenkins
(74) *Attorney, Agent, or Firm* — Kinney & Lange, P.A.

(57) ABSTRACT

An air data probe includes a housing and a probe head with a body, total pressure and alpha chambers, total pressure and alpha ports, and alpha drain ports. The total pressure chamber extends through a radial center of the body. The alpha chambers are disposed radially outward from the total pressure chamber. The total pressure port is disposed in a distal end of the body is collinear with a centerline axis of the body. The total pressure chamber is in fluid communication with the total pressure port and with the housing. The alpha ports are disposed downstream of the total pressure port and upstream of the housing. The alpha chambers are in fluid communication with the alpha ports. The alpha drain ports are disposed downstream from the alpha port and upstream from the housing. The alpha drain ports fluidly communicate with the alpha chamber.

17 Claims, 3 Drawing Sheets

(56) References Cited

U.S. PATENT DOCUMENTS

| | | | |
|---|---|---|---|
| 9,027,392 B2* | 5/2015 | Vander Hoek | G01F 1/34 |
| | | | 73/112.01 |
| 9,243,963 B2* | 1/2016 | Thorpe | G01K 13/028 |
| 9,404,936 B2 | 8/2016 | Ashton | |
| 9,631,960 B2 | 4/2017 | Seidel et al. | |
| 9,696,187 B2* | 7/2017 | Whalen | G01F 1/34 |
| 9,772,345 B2 | 9/2017 | Golly et al. | |
| 10,126,320 B2* | 11/2018 | Anderson | G01P 5/165 |
| 10,180,077 B2* | 1/2019 | Waddington | G01P 5/06 |
| 10,227,139 B2* | 3/2019 | Golly | B64D 43/02 |
| 10,281,303 B2* | 5/2019 | Johnson | G01F 1/46 |
| 2015/0059465 A1* | 3/2015 | Leblond | G01P 13/025 |
| | | | 73/170.02 |
| 2016/0356175 A1 | 12/2016 | Waddington | |
| 2018/0259547 A1* | 9/2018 | Abdullah | G01P 5/165 |
| 2018/0348076 A1* | 12/2018 | Martin | G01P 5/165 |

* cited by examiner

PITOT-STATIC PROBE WITH PNEUMATIC ANGLE-OF-ATTACK SENSOR

BACKGROUND

The present disclosure relates generally to air data probes, and in particular, to management of liquid during use of air data probes.

Air data probes are installed on aircraft to gather pneumatic pressures that permit the measurement of air data parameters. Air data probes sample air pressure, at one or more locations along a probe head, to permit measurement of pressures for generating air data parameters such as speed, altitude, and angle-of-attack.

In particular, pitot-static style air data probes are susceptible to water ingestion in rain conditions and in warm supercooled liquid water conditions. Water ingestion into pitot-style air data probes can cause large induced pressure errors that influence the calculation of the air data parameters. Water management in these conditions is difficult due to competing requirements of preventing complete blockage of the sense-line (pressure tube) and the ability to quickly purge water from the sense lines and ports after exiting the icing or rain condition.

SUMMARY

An air data probe for use with an aircraft includes a housing and a probe head attached to the housing. The probe head includes a body, a total pressure port, a total pressure chamber, first and second alpha ports, first and second alpha chambers, and first and second alpha drain ports. The body is connected to and extends from the housing and includes an outer wall region and a tubular shape. The body is connected to the housing at downstream end of the body. The total pressure port is disposed in a distal end of the body opposite from the housing and is aligned collinear with a centerline axis of the body. The distal end of the body opposite from the housing comprises an upstream end of the body. The total pressure chamber extends through a radial center of the body and is in fluid communication with the total pressure port and with the housing. The first alpha port is disposed in the body at a location positioned downstream of the total pressure port and upstream of the housing. The first alpha chamber extends through the body and is in fluid communication with the first alpha port. The first alpha chamber is disposed radially outward from the total pressure chamber. The first alpha drain port is disposed in the body at a location positioned downstream from the first alpha port and upstream from the housing. The first alpha drain port is in fluid communication with the first alpha chamber. The second alpha port is disposed in the body at a location positioned downstream of the total pressure port and upstream of the housing. The second alpha chamber extends through the body and is in fluid communication with the second alpha port. The second alpha chamber is disposed radially outward from the total pressure chamber. The second alpha drain port is disposed in the body at a location positioned downstream from the second alpha port and upstream from the housing. The second alpha drain port is in fluid communication with the second alpha chamber.

A method of removing liquid from an air data probe of an aircraft includes moving the air data probe of the aircraft relative to an ambient environment that is external to the air data probe. The air data probe includes a housing and a probe head attached to the housing. The probe head includes a body, a total pressure port, a total pressure chamber, first and second alpha ports, first and second alpha chambers, and first and second alpha drain ports. The body is connected to and extends from the housing and includes an outer wall region and a tubular shape. The body is connected to the housing at downstream end of the body. The total pressure port is disposed in a distal end of the body opposite from the housing and is aligned collinear with a centerline axis of the body. The distal end of the body opposite from the housing comprises an upstream end of the body. The total pressure chamber extends through a radial center of the body and is in fluid communication with the total pressure port and with the housing. The first alpha port is disposed in the body at a location positioned downstream of the total pressure port and upstream of the housing. The first alpha chamber extends through the body and is in fluid communication with the first alpha port. The first alpha chamber is disposed radially outward from the total pressure chamber. The first alpha drain port is disposed in the body at a location positioned downstream from the first alpha port and upstream from the housing. The first alpha drain port is in fluid communication with the first alpha chamber. The second alpha port is disposed in the body at a location positioned downstream of the total pressure port and upstream of the housing. The second alpha chamber extends through the body and is in fluid communication with the second alpha port. The second alpha chamber is disposed radially outward from the total pressure chamber. The second alpha drain port is disposed in the body at a location positioned downstream from the second alpha port and upstream from the housing. The second alpha drain port is in fluid communication with the second alpha chamber. Liquid is discharged from the alpha chamber out of the first alpha drain port and into the ambient environment.

DETAILED DESCRIPTION

For an aircraft angle-of-attack sensor, a probe barrel of the sensor includes a pair of ports on opposing ends of the barrel, with a first static inlet port (or ports) on one end and an outlet or drainage port (or ports) at a different location to provide a drainage path for water impinging on the inlet ports in order to minimize the impact on measured pressures and consequently on calculated angle-of-attack.

Figure 1:
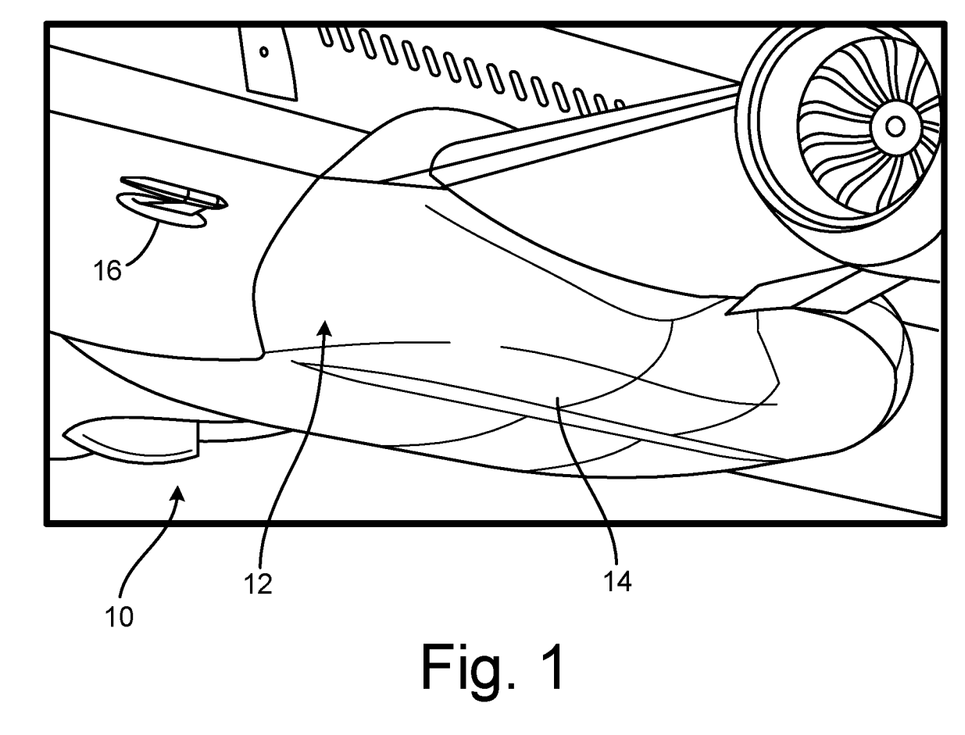
FIG. 1 is a perspective view of a portion of an aircraft with an air data probe.

FIG. 1 shows a partial perspective view of aircraft 10 and shows fuselage 12, bottom surface 14, and air data probe 16. Aircraft 10 is an airplane. In other non-limiting embodiments, aircraft 10 could also be other types of fixed-wing or rotorcraft such as propeller aircraft, jet aircraft, or helicopters. Fuselage 12 is a main body section of aircraft 10. Bottom surface 14 is a surface along the bottom of aircraft 10. Air data probe 16 is a pitot-static pneumatic angle-of-attack sensor (i.e., pneumatic pitot-tube sensor).

Bottom surface 14 is connected and attached to fuselage 12 of aircraft 10. Air data probe 16 is physically connected to and located along bottom surface 14 of aircraft 10. In one non-limiting embodiment, air data probe 16 may be mounted to fuselage 12 of aircraft 10 via fasteners, such as screws or bolts. In other non-limiting embodiments, air data probe 16 can be attached to aircraft 10 at any location along aircraft 10. Air data probe 16 extends from bottom surface 14 of aircraft 10 and into an ambient environment that is exterior to and that surrounds aircraft 10. In this non-limiting environment, air data probe 16 points into an upstream direction (to the left in FIG. 1) relative to an intended direction of flight of the aircraft (to the left in FIG. 1). Correspondingly, as aircraft 10 is moving in the right-to-left upstream direction during flight, the ambient environment is moving in a downstream direction (left-to-right in FIG. 1) relative to aircraft 10.

Air data probe 16 samples pneumatic pressures, at one or more locations along air data probe 16, to permit measurement of pressures for generating air data parameters such as speed, altitude, angle-of-sideslip, and angle-of-attack. In this non-limiting embodiment, air data probe 16 is configured to calculate an air data parameter of aircraft 10. Also in this non-limiting embodiment, air data probe 16 is configured to sense changes in pressure in an ambient environment surrounding air data probe 16.

Air data probe 16 is susceptible to water ingestion in rain conditions and in warm supercooled liquid water conditions. Water ingestion into air data probe 16 can cause large induced pressure errors that influence the calculation of the measured air data parameters. As will be discussed with respect to FIGS. 2 and 3, the configuration of air data probe 16 helps to manage impinged water out of the air data probe 16 and away from pressure sense lines and assists with quickly purging water from the pressure sense lines and ports after exiting the icing or rain condition. As such, the configuration of air data probe 16 minimizes the impact of ingested water on measured pressures and consequently calculated angle-of-attack of aircraft 10.

Figure 2:
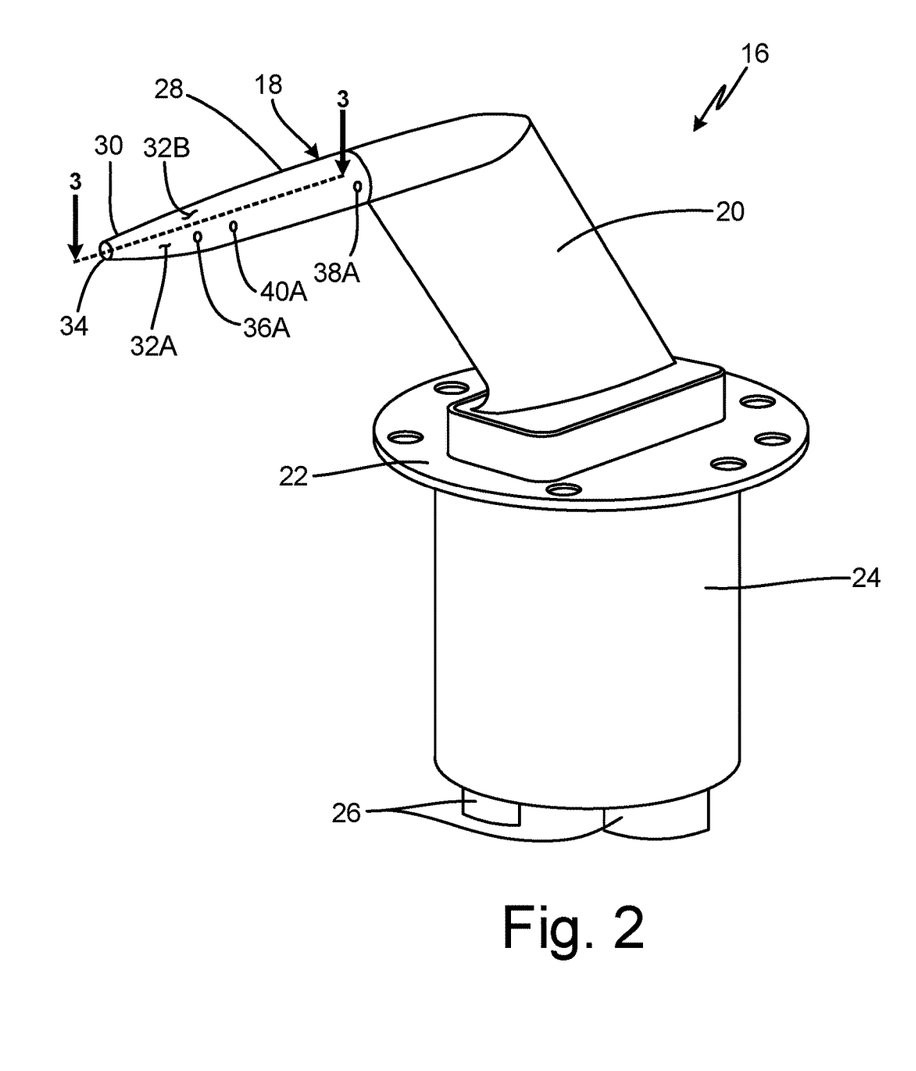
FIG. 2 is a perspective view of the air data probe.
Figure 3:
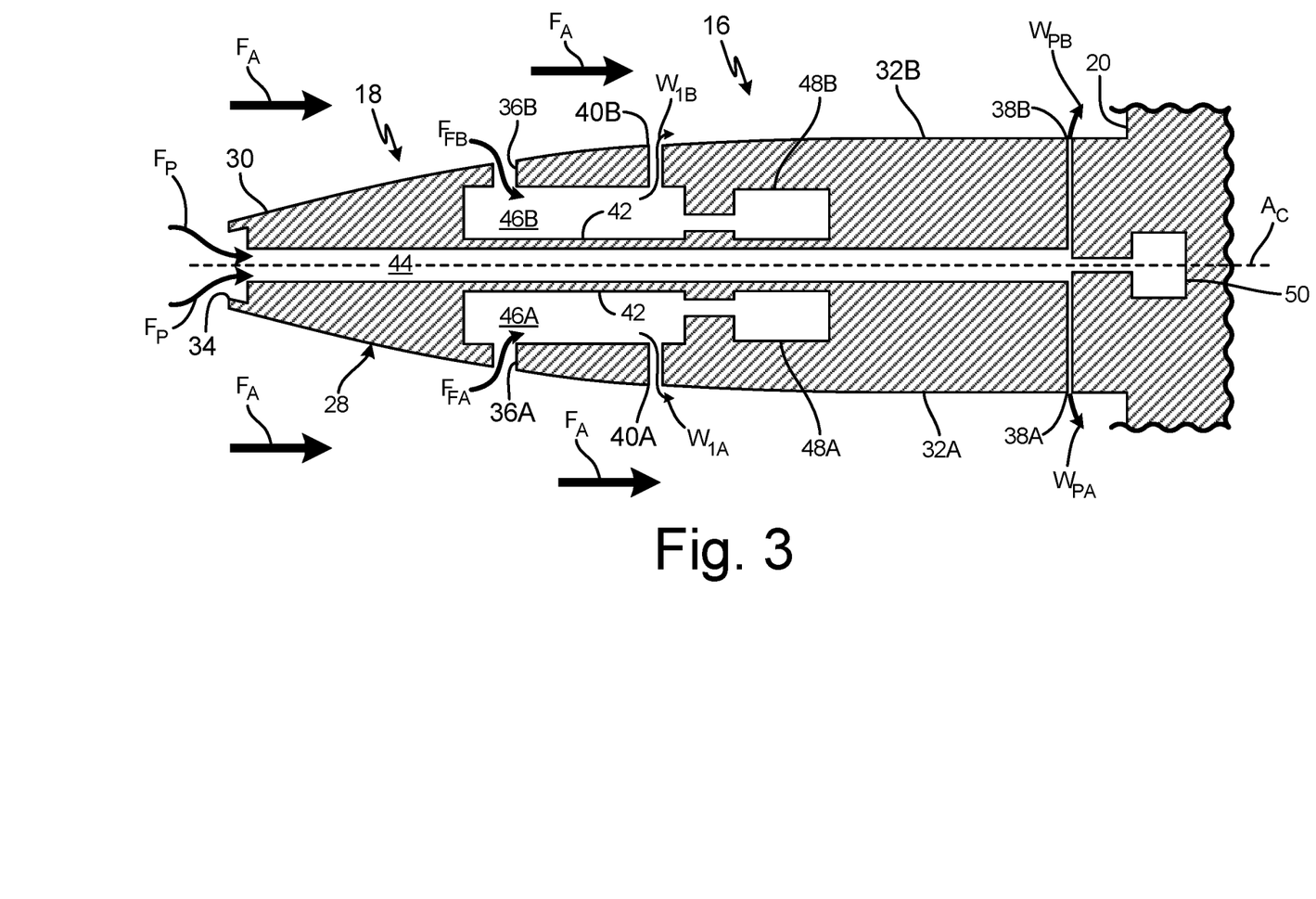
FIG. 3 is a cross-section view taken along 3-3 in FIG. 2 of a probe head of the air data probe.

FIG. 2 is a perspective view of air data probe 16 and shows probe head 18, strut 20, baseplate 22, can 24, communication ports 26, body 28, tip 30, first and second outer wall regions 32A and 32B, total pressure ("$P_T$") port 34, first alpha port 36A, first total pressure drain port 38A, and first alpha drain port 40A. In FIG. 2, the orientation of air data probe 16 has been rotated 90 degrees about an axis of body 28 as compared to the orientation of air data probe 16 shown in FIG. 1. In this non-limiting embodiment, air data probe 16 also has a second set of ports including second alpha port 36B, second total pressure drain port 38B, and second alpha drain port 40B on an opposite side of body 28, which are shown in FIG. 3 and will be discussed in conjunction with FIG. 3.

Probe head 18 is a tubular object and is the sensing head of air data probe 16. Probe head 18 has one or more ports positioned in probe head 18 (see e.g., FIG. 3). In this non-limiting embodiment, probe head 18 is cylindrically shaped with a gradual taper. In this non-limiting embodiment, strut 20 is a hollow, blade-shaped housing or casing. In one non-limiting embodiment, strut 20 can be a casting. Baseplate 22 is a circular or elliptical disk of solid material that can include holes. Can 24 is a cylindrically shaped mounting canister, housing, or container that contains pressure sensors and electronic circuitry. In other non-limiting embodiments, air data probe 16 may not include can 24. Communication ports 26 include electrical contacts for providing electrical connection to the electronic circuitry within can 24.

Body 28 is a tube including a series of internal chambers that are disposed within first and second outer wall regions 32A and 32B. In this non-limiting embodiment, body 28 includes a generally tubular shape with a gradual taper towards tip 30 and a barrel portion between tip 30 and strut 20. Tip 30 is a distal end of body 28 that is on an opposite end of body 28 from strut 20. First and second outer wall regions 32A and 32B form an exterior boundary of body 28. $P_T$ port 34 and first alpha port 36A are fluidic inlets. In this non-limiting embodiment, body 28 includes $P_T$ port 34 and first alpha port 36A. In other non-limiting embodiment, body 28 can include more or less inlet ports than $P_T$ port 34 and first alpha port 36A. $P_T$ port 34 is a total pressure port also known as an impact pressure port or a pitot pressure port. First alpha port 36A is an alpha port and is also known as a static pressures port or an angle-of-attack port.

First total pressure drain port 38A and first alpha drain port 40A are water drain ports or fluidic outlets. In this non-limiting embodiment, body 28 includes first total pressure drain port 38A and first alpha drain port 40A. In other non-limiting embodiment, body 28 can include more or less outlet ports than first total pressure drain port 38A and first alpha drain port 40A.

Air data probe 16 is installed on aircraft 10, as shown in FIG. 1. Internal components, such as sensors or other electronics, of air data probe 16 can be located within portions of probe head 18, strut 20, and/or can 24. Probe head 18 is connected to a first end of strut 20. Probe head 18 extends into an ambient environment disposed externally from and that surrounds aircraft 10 and air data probe 16. In this non-limiting embodiment, probe head 18 is aligned with a direction of airflow across air data probe 16, shown as generally left-to-right in FIGS. 1, 2 and 3. A second end of strut 20 is connected to can 24. As such, strut 20 connects probe head 18 to can 24. Baseplate 22 is positioned and connected between strut 20 and can 24. Baseplate connects and attaches air data probe 16 to aircraft 10. In one non-limiting embodiment, can 24 attaches to and is set into a portion of bottom surface 14 of aircraft 10. Communication ports 16 form an electrical connection and communicate with corresponding communication ports located in the portion of aircraft 10 where air data probe 16 is installed.

Body 28 is attached and fluidly connected to a portion of strut 20. In this non-limiting embodiment, body 28 is oriented such that tip 30 of body 28 points towards an upstream direction of body 28. For example, as aircraft 10 (shown in FIG. 1) moves during flight, body 28 moves in an upstream direction (right-to-left in FIG. 2). First and second outer wall regions 32A and 32B are disposed along a radially outward edge of body 28. Body 28 and its components are housed and contained by first and second outer wall regions 32A and 32B. Centerline axis $A_C$ extends through a radial center of body 28.

$P_T$ port 34 and first alpha port 36A are disposed in first and second outer wall regions 32A and 32B of body 28. $P_T$ port 34 is disposed in tip 30 of body 28 and is fluidly connected to total pressure chamber 44. In this non-limiting embodiment, $P_T$ port 34 is aligned collinear with centerline axis $A_C$ of body 28. First alpha port 36A is disposed in first outer wall region 32A of body 28 at a location positioned downstream of $P_T$ port 34 and upstream of strut 20. In this non-limiting embodiment, first alpha port 36A is disposed axially along first outer wall region 32A between $P_T$ port 34 and first alpha drain port 40A. First alpha port 36A, first total pressure drain port 38A, and first alpha drain port 40A are disposed in first outer wall region 32A of body 28. As will be shown in FIG. 3, second alpha port 36B, second total pressure drain port 38B, and second alpha drain port 40B are disposed in second outer wall region 32B of body 28.

Air data probe 16 uses the pressure measurements to generate air data parameters related to the aircraft flight conditions, such as the speed, altitude, angle-of-sideslip, or angle-of-attack of the aircraft. In one non-limiting embodiment, air data probe 16 includes an angle-of-attack sensor configured to calculate an angle-of-attack of air data probe 16 so as to calculate an angle-of-attack of aircraft 10. Probe head 18 takes in air from surrounding airflow via the one or more ports positioned in probe head 18. Air pressures from probe head 18 are communicated pneumatically through internal components of probe head 18 and strut 20 to reach internal components within can 24. Strut 20 holds probe head 18 away from fuselage 12 of aircraft 10 to expose probe head 18 to the oncoming airflow outside of a boundary layer flow along a surface of aircraft 10. Can 24 can house pressure sensors and electronics. Can 24 provides an anchoring functionality for attaching air data probe 16 to aircraft 10 by way of setting into a depressed portion or receptacle in aircraft 10 that is shaped to receive can 24. Pressure sensors and/or other components within can 24, or elsewhere in aircraft 10, measure the air pressures provided by probe head 18.

FIG. 3 is a cross-section view of probe head 18 taken along 3-3 in FIG. 2 and shows air data probe 16, probe head 18 (with body 28, tip 30, first and second outer wall regions 32A and 32B, centerline axis $A_C$, total pressure ("$P_T$") port 34, first and second alpha ports 36A and 36B, first and second total pressure drain ports 38A and 38B, first and second alpha drain ports 40A and 40B, interior walls 42, total pressure chamber 44, first and second alpha chambers 46A and 46B, first and second alpha pressure sensors 48A and 48B, and pitot pressure sensor 50), and strut 20. Arrows illustrate ambient flow $F_A$, total pressure flow $F_P$, alpha flows $F_{FA}$ and $F_{FB}$, total pressure water flows $W_{PA}$ and $W_{PB}$, and alpha water flows $W_{1A}$ and $W_{1B}$.

Centerline axis $A_C$ is a straight imaginary line extending through a radial center of body 28. Interior walls 42 are barriers or partitions of solid material. Total pressure chamber 44 and first and second alpha chambers 46A and 46B are fluidic channels or passageways. In this non-limiting embodiment, body 28 includes total pressure chamber 44 and first and second alpha chambers 46A and 46B. In other non-limiting embodiment, body 28 can include more or less inlet ports than total pressure chamber 44 and first and second alpha chambers 46A and 46B. First and second alpha pressure sensors 48A and 48B and pitot pressure sensor 50 are devices that detect or measure air pressure. Ambient flow $F_A$, total pressure flow $F_P$, and alpha flows $F_{FA}$ and $F_{FB}$ are flows of fluid such as air (or a combination of air and liquid, such as water). Total pressure water flows $W_{PA}$ and $W_{PB}$ and alpha water flows $W_{1A}$ and $W_{1B}$ are drainage flows of water.

First and second total pressure drain ports 38A and 38B are fluidly connected to total pressure chamber 44. In this non-limiting embodiment, first and second total pressure drain ports 38A and 38B are positioned downstream of first and second alpha drain ports 40A and 40B and upstream of strut 20. First and second alpha drain ports 40A and 40B are fluidly connected to first and second alpha chambers 46A and 46B, respectively. In this non-limiting embodiment, first and second alpha drain ports 40A and 40B are positioned upstream of first and second total pressure drain ports 38A and 38B, respectively and upstream of strut 20. In this non-limiting embodiment, first and second alpha drain ports 40A and 40B are disposed axially between first and second total pressure drain ports 38A and 38B and alpha inlet ports 36A and 36B, respectively.

Interior walls 42 are disposed in an interior of body 28. Interior walls 42 surround portions of total pressure chamber 44 and first and second alpha chambers 46A and 46B. Total pressure chamber 44 is fluidly connected to $P_T$ port 34, to first and second total pressure drain ports 38A and 38B, and to pitot pressure sensor 50. First and second alpha chambers 46A and 46B are fluidly connected to alpha inlet ports 36A and 36B, to alpha drain ports 42A and 42B, and to first and second alpha pressure sensors 48A and 48B, respectively. In this non-limiting embodiment, each of first and second alpha chambers 46A and 46B are singular chambers. In other non-limiting embodiments, first and second alpha chambers 46A and 46B can include one or more fluidly separated chambers. In this non-limiting embodiment, total pressure chamber 44 and first and second alpha chambers 46A and 46B are collinear with centerline axis $A_C$ and are coaxial with body 28. First and second alpha pressure sensors 48A and 48B are disposed in body 28 and are in fluid communication with first and second alpha chambers 46A and 46B, respectively. In this non-limiting embodiment, pitot pressure sensor 50 is disposed in strut 20 and is in fluid communication with total pressure chamber 44.

Ambient flow $F_A$ is disposed exterior to body 28. Ambient flow $F_A$ is in fluid communication with $P_T$ port 34, first and second alpha ports 36A and 36B, first and second total pressure drain ports 38A and 38B, and first and second alpha drain ports 40A and 40B. Total pressure flow $F_P$ is a portion of ambient flow $F_A$ that enters into body 28 through $P_T$ port 34. Total pressure flow $F_P$ is disposed in total pressure chamber 44. Alpha flows $F_{FA}$ and $F_{FB}$ are portions of ambient flow $F_A$ that enter into body 28 through first and second alpha ports 36A and 36B. Alpha flows $F_{FA}$ and $F_{FB}$ are disposed in first and second alpha chambers 46A and 46B. Total pressure water flows $W_{PA}$ and $W_{PB}$ and alpha water flows $W_{1A}$ and $W_{1B}$ are portions of total pressure flow $F_P$ and alpha flows $F_{FA}$ and $F_{FB}$, respectively, that are ejected from body 28 via total pressure drain port 36 and first and second alpha drain ports 40A and 40B, respectively.

In this non-limiting embodiment, air data probe 16 is configured to sense changes in pressure in an environment surrounding body 28 of air data probe 16. $P_T$ port 34 functions as the pitot source for air data probe 16. First and second alpha ports 36A and 36B function as static pressure sources for air data probe 16. First and second total pressure drain ports 38A and 38B and first and second alpha drain ports 40A and 40B allow ingested water to drain out of total pressure chamber 44 and first and second alpha chambers 46A and 46B, respectively.

Interior walls 42 fluidly separate and compartmentalize total pressure chamber 44 and alpha chamber 46 from each other. Interior walls 42 also define physical boundaries for total pressure port 34 and first and second alpha drain ports 40A and 40B. Total pressure chamber 44 transports total pressure flow $F_P$ to pitot pressure sensor 50 so that total pressure flow $F_P$ can be used to measure pressure differentials between total pressure flow $F_P$ and alpha flows $F_{FA}$ and $F_{FB}$ in order to calculate air data parameters. Likewise, first and second alpha chambers 46A and 46B transport alpha flows $F_{FA}$ and $F_{FB}$ respectively to first and second alpha pressure sensors 48A and 48B.

Ambient flow $F_A$ provides body 28 with sources of air from which to measure pressure differentials and calculate air data parameters. Total pressure flow $F_P$ and alpha flows $F_{FA}$ and $F_{FB}$ are guided into first and second alpha pressure sensors 48A and 48B and pitot pressure sensor 50 by interior walls 42. Components within strut 20, can 24, and/or aircraft 10 measure differential pressure changes between total pressure flow $F_P$ and alpha flows $F_{FA}$ and $F_{FB}$. The measurements of differential pressure changes between total pressure flow $F_P$ and alpha flows $F_{FA}$ and $F_{FB}$ are then used to calculate air data parameters of aircraft 10 such as speed, altitude, angle-of-sideslip, and angle-of-attack. Total pressure water flows $W_{PA}$ and $W_{PB}$ and alpha water flows $W_{1A}$ and $W_{1B}$ are removed via ejection/discharging from body 28 of air data probe 16.

The means of drainage of total pressure water flows $W_{PA}$ and $W_{PB}$ and alpha water flows $W_{1A}$ and $W_{1B}$ is by creating a pressure gradient between the sensing ports and the drainage ports, with the sensor ports including $P_T$ port 34 and first and second alpha ports 36A and 36B and the drainage ports including first and second total pressure drain ports 38A and 38B and first and second alpha drain ports 40A and 40B. For example, alpha water flows $W_{1A}$ and $W_{1B}$ are discharged from alpha chamber 46 in response to a pressure differential between alpha chamber 46 and the ambient environment. Similarly, total pressure water flows $W_{PA}$ and $W_{PB}$ are discharged from total pressure chamber 44 in response to a pressure differential between total pressure chamber 44 and the ambient environment.

In existing air data probes with angle-of-attack sensors, the static ports are directly connected to a sensing chamber within the housing with no drainage ports. First and second total pressure drain ports 38A and 38B and first and second alpha drain ports 40A and 40B allow ingested water to drain out of probe head 18 while minimally impacting the sensitivity of the static pressure measurement by air data probe 16 in order to calculate air data parameters such as speed, altitude, and angle-of-attack.

DISCUSSION OF POSSIBLE EMBODIMENTS

The following are non-exclusive descriptions of possible embodiments of the present invention.

An air data probe for use with an aircraft includes a housing and a probe head attached to the housing. The probe head includes a body, a total pressure port, a total pressure chamber, first and second alpha ports, first and second alpha chambers, and first and second alpha drain ports. The body is connected to and extends from the housing and includes an outer wall region and a tubular shape. The body is connected to the housing at downstream end of the body. The total pressure port is disposed in a distal end of the body opposite from the housing and is aligned collinear with a centerline axis of the body. The distal end of the body opposite from the housing comprises an upstream end of the body. The total pressure chamber extends through a radial center of the body and is in fluid communication with the total pressure port and with the housing. The first alpha port is disposed in the body at a location positioned downstream of the total pressure port and upstream of the housing. The first alpha chamber extends through the body and is in fluid communication with the first alpha port. The first alpha chamber is disposed radially outward from the total pressure chamber. The first alpha drain port is disposed in the body at a location positioned downstream from the first alpha port and upstream from the housing. The first alpha drain port is in fluid communication with the first alpha chamber. The second alpha port is disposed in the body at a location positioned downstream of the total pressure port and upstream of the housing. The second alpha chamber extends through the body and is in fluid communication with the second alpha port. The second alpha chamber is disposed radially outward from the total pressure chamber. The second alpha drain port is disposed in the body at a location positioned downstream from the second alpha port and upstream from the housing. The second alpha drain port is in fluid communication with the second alpha chamber.

The air data probe of the preceding paragraph can optionally include, additionally and/or alternatively, any one or more of the following features, configurations and/or additional components.

The air data probe can comprise an angle-of-attack sensor configured to calculate an angle between the air data probe and a direction of a flow of fluid flowing across the air data probe.

The air data probe can comprise a pneumatic pitot-tube sensor configured to sense changes in pressure in an environment surrounding the body of the air data probe.

The total pressure port can be configured to take in fluid from an ambient environment external to the air data probe and through which the aircraft can be moving relative to.

The first alpha drain port can be configured to drain liquid from the alpha chamber of the body to outside of the body.

A total pressure drain port can be disposed in the body of the probe head, wherein the total pressure drain port can be fluidly connected to the total pressure chamber, and wherein the total pressure drain port can be configured to drain liquid from the total pressure chamber of the body to outside of the body.

A total pressure drain port is disposed in the body at a location positioned downstream from the total pressure port and upstream from the housing, wherein the total pressure drain port can be in fluid communication with the total pressure chamber.

The air data probe can be configured to discharge liquid from the total pressure chamber in response to a pressure differential between the total pressure chamber and an ambient environment.

A method of removing liquid from an air data probe of an aircraft includes moving the air data probe of the aircraft relative to an ambient environment that is external to the air data probe. The air data probe includes a housing and a probe head attached to the housing. An air data probe for use with an aircraft includes a housing and a probe head attached to the housing. The probe head includes a body, a total pressure port, a total pressure chamber, first and second alpha ports, first and second alpha chambers, and first and second alpha drain ports. The body is connected to and extends from the housing and includes an outer wall region and a tubular shape. The body is connected to the housing at downstream end of the body. The total pressure port is disposed in a distal end of the body opposite from the housing and is aligned collinear with a centerline axis of the body. The distal end of the body opposite from the housing comprises an upstream end of the body. The total pressure chamber extends through a radial center of the body and is in fluid communication with the total pressure port and with the housing. The first alpha port is disposed in the body at a location positioned downstream of the total pressure port and upstream of the housing. The first alpha chamber extends through the body and is in fluid communication with the first alpha port. The first alpha chamber is disposed radially outward from the total pressure chamber. The first alpha drain port is disposed in the body at a location positioned downstream from the first alpha port and upstream from the housing. The first alpha drain port is in fluid communication with the first alpha chamber. The second alpha port is disposed in the body at a location positioned downstream of the total pressure port and upstream of the housing. The second alpha chamber extends through the body and is in fluid communication with the second alpha port. The second alpha chamber is disposed radially outward from the total pressure chamber. The second alpha drain port is disposed in the body at a location positioned downstream from the second alpha port and upstream from the housing. The second alpha drain port is in fluid communication with the second alpha chamber. Liquid is discharged from the alpha chamber out of the first alpha drain port and into the ambient environment.

The method of the preceding paragraph can optionally include, additionally and/or alternatively, any one or more of the following steps, features, configurations and/or additional components.

Liquid can be discharged from the total pressure chamber out of the total pressure drain port and into the ambient environment.

A change in pressure of a fluid in the air data probe can be sensed.

An angle-of-attack of the air data probe can be calculated based on the sensed change in pressure.

A downstream direction can include a direction of flow of the ambient environment relative to the air data probe of the aircraft, wherein the first alpha drain port can be located downstream of the alpha port.

The liquid can be discharged from the alpha chamber in response to a pressure differential between the alpha chamber and the ambient environment.

A total pressure drain port is disposed in the body at a location positioned downstream from the total pressure port and upstream from the housing, wherein the total pressure drain port can be in fluid communication with the total pressure chamber.

Liquid can be discharged from the total pressure chamber in response to a pressure differential between the total pressure chamber and an ambient environment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe for use with an aircraft, the air data probe comprising:
    a housing; and
    a probe head attached to the housing, wherein the probe head further comprises:
        a body connected to and extending from the housing, wherein the body comprises an outer wall region and a tubular shape, wherein body is connected to the housing at a downstream end of the body;
        a total pressure port disposed in a distal end of the body opposite from the housing, wherein the distal end of the body opposite from the housing comprises an upstream end of the body, wherein the total pressure port is aligned collinear with a centerline axis of the body;
        a total pressure chamber extending through a radial center of the body, wherein the total pressure chamber is in fluid communication with the total pressure port and with the housing;
        a first alpha port disposed in the body at a location positioned downstream of the total pressure port and upstream of the housing;
        a first alpha chamber extending through a portion of the body, wherein the first alpha chamber is in fluid communication with the first alpha port, wherein the first alpha chamber is disposed radially outward from the total pressure chamber;
        a first alpha drain port disposed in the body at a location positioned downstream from the first alpha port and upstream from the housing, wherein the first alpha drain port is in fluid communication with the first alpha chamber;
        a second alpha port disposed in the body at a location positioned downstream of the total pressure port and upstream of the housing;
        a second alpha chamber extending through the body, wherein the second alpha chamber is in fluid communication with the second alpha port, wherein the second alpha chamber is disposed radially outward from the total pressure chamber; and
        a second alpha drain port disposed in the body at a location positioned downstream from the second alpha port and upstream from the housing, wherein the second alpha drain port is in fluid communication with the second alpha chamber.

2. The air data probe of claim 1, wherein the air data probe comprises an angle-of-attack sensor configured to calculate an angle between the air data probe and a direction of a flow of fluid flowing across the air data probe.

3. The air data probe of claim 1, wherein the air data probe comprises a pneumatic pitot-tube sensor configured to sense changes in pressure in an environment surrounding the body of the air data probe.

4. The air data probe of claim 3, wherein the total pressure port is configured to take in fluid from an ambient environment external to the air data probe and through which the aircraft is moving relative to.

5. The air data probe of claim 1, wherein the first alpha drain port is configured to drain liquid from the first alpha chamber of the body to outside of the body, wherein the second alpha drain port is configured to drain liquid from the second alpha chamber of the body to outside of the body.

6. The air data probe of claim 1, further comprising a total pressure drain port disposed in the body of the probe head, wherein the total pressure drain port is fluidly connected to the total pressure chamber, and wherein the total pressure drain port is configured to drain liquid from the total pressure chamber of the body to outside of the body.

7. The air data probe of claim 1, further comprising a total pressure drain port disposed in the body at a location positioned downstream from the total pressure port and upstream from the housing, wherein the total pressure drain port is in fluid communication with the total pressure chamber.

8. The air data probe of claim 1, wherein the air data probe is configured to discharge liquid from the first alpha chamber in response to a pressure differential between the first alpha chamber and an ambient environment.

9. The air data probe of claim 1, wherein the air data probe is configured to discharge liquid from the total pressure chamber in response to a pressure differential between the total pressure chamber and an ambient environment.

10. A method of removing liquid from an air data probe of an aircraft, the method comprising:
    moving the air data probe of the aircraft relative to an ambient environment that is external to the air data probe, wherein the air data probe comprises:
        a housing; and a probe head attached to the housing, wherein the probe head further comprises:
    a body connected to and extending from the housing, wherein the body comprises an outer wall region and a tubular shape, wherein body is connected to the housing at downstream end of the body;
    a total pressure port disposed in a distal end of the body opposite from the housing, wherein the distal end of the body opposite from the housing comprises an upstream end of the body, wherein the total pressure port is aligned collinear with a centerline axis of the body;
    a total pressure chamber extending through a radial center of the body, wherein the total pressure chamber is in fluid communication with the total pressure port and with the housing;
    a first alpha port disposed in the body at a location positioned downstream of the total pressure port and upstream of the housing;
    a first alpha chamber extending through the body, wherein the first alpha chamber is in fluid communication with the first alpha port, wherein the first alpha chamber is disposed radially outward from the total pressure chamber;
    a first alpha drain port disposed in the body at a location positioned downstream from the first alpha port and upstream from the housing, wherein the first alpha drain port is in fluid communication with the first alpha chamber;
    a second alpha port disposed in the body at a location positioned downstream of the total pressure port and upstream of the housing;
    a second alpha chamber extending through the body, wherein the second alpha chamber is in fluid communication with the second alpha port, wherein the second alpha chamber is disposed radially outward from the total pressure chamber;
    a second alpha drain port disposed in the body at a location positioned downstream from the second alpha port and upstream from the housing, wherein the second alpha drain port is in fluid communication with the second alpha chamber; and
discharging liquid from the alpha chamber out of the first alpha drain port and into the ambient environment.

11. The method of claim 10, further comprising discharging liquid from the total pressure chamber out of the total pressure drain port and into the ambient environment.

12. The method of claim 10, further comprising sensing a change in pressure of a fluid in the air data probe.

13. The method of claim 12, further comprising calculating an angle-of-attack of the air data probe based on the sensed change in pressure.

14. The method of claim 10, wherein a downstream direction includes a direction of flow of the ambient environment relative to the air data probe of the aircraft, wherein the first alpha drain port is located downstream of the alpha port.

15. The method of claim 10, wherein the liquid is discharged from the alpha chamber in response to a pressure differential between the alpha chamber and the ambient environment.

16. The method of claim 10, wherein liquid is discharged from the total pressure chamber in response to a pressure differential between the total pressure chamber and an ambient environment.

17. The method of claim 10, wherein the air data probe further comprises a total pressure drain port disposed in the body at a location positioned downstream from the total pressure port and upstream from the housing, wherein the total pressure drain port is in fluid communication with the total pressure chamber.

* * * * *